United States Patent [19]

Yurko

[11] 4,036,639

[45] July 19, 1977

[54] PRODUCTION OF COPPER

[75] Inventor: William J. Yurko, Edmonton, Canada

[73] Assignee: Sherritt Gordon Mines Limited, Toronto, Canada

[21] Appl. No.: 720,852

[22] Filed: Sept. 7, 1976

Related U.S. Application Data

[63] Continuation of Ser. No. 504,487, Sept. 10, 1974, abandoned.

[30] Foreign Application Priority Data

Sept. 10, 1973 Canada .................................. 180656

[51] Int. Cl.² .......................................... C22B 15/10
[52] U.S. Cl. .............................. 75/101 BE; 75/117; 423/24; 423/32
[58] Field of Search ............... 423/24, 32; 75/101 BE, 75/103, 117; 204/108

[56] References Cited

U.S. PATENT DOCUMENTS

| | | | |
|---|---|---|---|
| 2,576,314 | 11/1951 | Forward | 423/32 |
| 2,647,819 | 8/1953 | McGauley | 423/33 |
| 2,727,819 | 12/1955 | Kenny et al. | 423/33 |
| 2,822,263 | 2/1958 | Forward | 423/32 |
| 3,224,873 | 12/1965 | Swanson | 423/24 |
| 3,853,981 | 12/1974 | Hadzeriga | 423/32 |
| 3,929,598 | 12/1975 | Stern et al. | 75/101 R |
| 3,971,652 | 7/1976 | Bryson | 423/24 |

OTHER PUBLICATIONS

*Solvent Extraction,* Proceedings of the I.S.E.C., vol. II (1971), Society of Chemical Industry, London, pp. 1351-1355.

Ritcey et al., *The Canadian Mining and Metallurgical Bulletin,* (May 1972), pp. 46-50.

Boldt, *The Winning of Nickel,* Longmans Canada Ltd., Toronto, (1967), pp. 299-310.

*Primary Examiner*—O. R. Vertiz
*Assistant Examiner*—Brian E. Hearn
*Attorney, Agent, or Firm*—Robert F. Delbridge; Arne I. Fors; Frank I. Piper

[57] ABSTRACT

Substantially pure copper is produced from impure cupriferous materials by leaching the cupriferous material with an ammonium sulfate-containing ammoniacal solution in the presence of oxygen, followed by separating the copper-containing aqueous liquor from the insoluble leach residue and contacting the thus separated leach liquor with an organic extractant of the metal ion exchange type to extract the copper from the leach liquor. The organic phase comprising the copper-bearing organic extractant is separated from the aqueous phase comprising the leach liquor of reduced copper content, and the resulting copper-bearing organic extractant is contacted with an aqueous solution of sulfuric acid to strip the copper from the copper-bearing extractant. The copper containing acidic solution containing from 5 to 150 gms/l of dissolved copper is then separated from the solution of reconstituted organic extractant, and the desired high purity copper is recovered from this solution by electrowinning or other techniques such as direct hydrogen reduction.

7 Claims, 4 Drawing Figures

PRODUCTION OF COPPER

This is a continuation of application Ser. No. 504,487, filed Sept. 10, 1974 now abandoned.

This invention relates to a hydrometallurgical process for recovery of copper from impure copper-containing raw materials such as cupriferous sulfidic ores, concentrates and mattes. The conventional process for producing metallic copper from cupriferous sulfidic ores and concentrates involves smelting the sulfidic material in a reverberatory furnace to obtain a sulfidic copper-containing matte followed by oxidation of the matte in a converter to obtain impure blister copper. Both of these pyrometallurgical process steps generate copious quantities of noxious sulfur-containing fumes and stack gases which create a severe atmosphere pollution control problem for the operator. Moreover, subsequent process steps which involve fire-refining or electro-refining of the blister copper also pose special problems in air pollution.

Numerous hydrometallurgical processes have been proposed in the past for overcoming the pollution problems inherent in the conventional pyrometallurgical process but for various technical and economic reasons, insofar as I know, none of these has proved to be commercially practical for large scale copper production.

SUMMARY OF THE INVENTION

After an intensive investigation, I have now discovered and developed a new process for the production of high purity copper from such impure cupriferous materials as sulfidic copper ores, concentrates and mattes. My new process employs such wet chemical process steps as aqueous leaching and organic solvent extraction and the like and therefore substantially completely eliminates the acute atmospheric pollution problems associated with prior pyrometallurgical processes. Moreover, because the process is capable of producing high purity copper directly from impure cupriferous raw materials it is uniquely suited to be an essential part of the long sought "chemical refinery" wherein copper ores are mined, beneficated and reduced to metallic copper in an environment essentially free of noxious fumes.

Accordingly, my new process for producing high purity copper from impure cupriferous raw materials comprises leaching finely divided sulfidic copper-containing material under oxidizing conditions with an ammonium sulfate-containing ammoniacal leach medium to obtain a substantially iron-free copper-containing aqueous leach liquor. The resulting copper-containing leach liquor is separated from the insoluble leach residue and then is contacted with an organic extractant for copper of the ion exchange type that has substantially greater affinity for copper ions than for the other cations present in the leach liquor. The organic metal ion extractant is dissolved in a water-immiscible organic diluent preferably at a concentration of from 2 to 40% by volume, and the organic diluent advantageously is kerosene. The aqueous phase comprising the spent leach liquor of reduced copper content is separated from the organic phase comprising the solution of the copper-bearing liquid organic metal ion extractant. A portion of the spent leach liquor of reduced copper content is recycled to the leaching step of the process and the balance of the spent liquor is treated to recover ammonia and to remove sulphate ions therefrom to maintain a sulphur balance in the process circuit. The copper-bearing organic phase is contacted with an aqueous solution of sulfuric acid to strip the copper from the copper-bearing extractant and thereby reconstitute the extractant for re-use in the process. The organic phase comprising the solution of the reconstituted organic liquid metal ion extractant is separated from the aqueous phase comprising an acidic solution of copper sulfate of high purity. This solution, which normally will contain between 5 and 150 gms/l dissolved copper, is then treated for recovery of elemental copper by electrowinning techniques or by direct reduction techqniues employing reductants such as hydrogen gas or carbon monoxide at elevated temperature and pressures. In either case, the lean electrolyte remaining after copper recovery is recycled to the copper stripping operation.

In the preferred practice of my invention, that portion of the leach liquor of reduced copper content from the solvent extraction-of-copper step of the process which is treated for removal of sulphate ions is first treated in a high temperature oxidation step in which substantially all sulphur values in the liquor are oxidized to sulphate form. This ensures that sulphur values in non-sulphate form will not build up in the process circuit. As hereinafter more fully described, the treatment of the spent leach liquor to remove sulphate ions may include distillation of water to precise ammonium sulphate and/or treatment with slaked lime precipitate and remove calcium sulphate and to regenerate ammonia. The process may also include treatment with carbon dioxide to precipitate and remove zinc as basic zinc carbonate, treatment with hydrogen sulphide to precipitate and remove nickel and cobalt sulphides and the like, evaporation to remove water and concentrate the leach liquor, ammoniation to replenish the ammonia lost in the process, and the like. Moreover, in a modification of my process cupriferous sulphidic materials that contain more than about 20% by weight sulphur may advantageously be given a fluidized bed roaster in order to make the material more amenable to leaching, particularly under milder leaching conditions.

BRIEF DESCRIPTION OF THE DRAWINGS

My invention will be better understood from the following description thereof in conjunction with the accompanying drawings in which.

DETAILED DESCRIPTION

Figure 1:
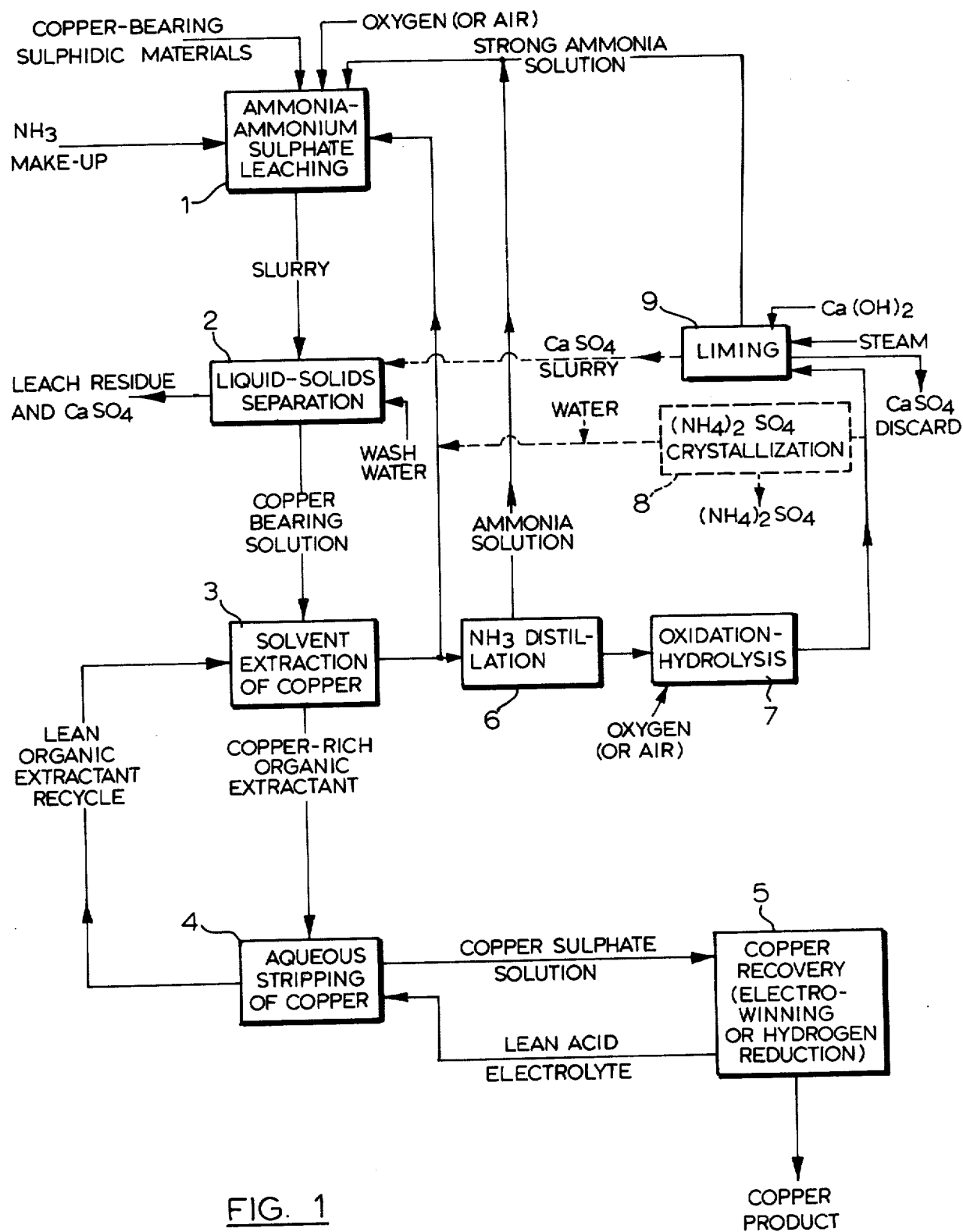
FIG. 1 is a schematic flow sheet of a preferred embodiment of the process of my invention wherein the cupriferous raw material is subject to co-current leaching with the ammonia-ammonium sulphate leach solution.

As shown in FIG. 1, the preferred practice of the process of my invention comprises a co-current leaching step 1 wherein copper-containing sulphidic raw materials are leached with an ammonia and ammonium sulphate containing aqueous leach medium; a leach liquor separation step 2 wherein the resulting copper-containing leach liquor is separated from the insoluble leach residue; a solvent extraction-of-copper step 3 wherein copper is extracted from the leach liquor with an organic liquid metal ion extractant; and a copper-stripping step 4 wherein copper is stripped from the organic liquid metal ion extractant with an aqueous solution of sulphuric acid to obtain an aqueous acidic solution of copper sulphate of high purity which is passed to copper recovery step 5 for production of pure metallic copper. The spent leach liquor of reduced copper content from the solvent extraction step 3 is subjected to distillation step 6, an oxidation-hydrolysis step 7 and then either an ammonium sulphate crystallization step 8 (shown in broken lines) or a liming step 9 wherein slaked lime is added to the liquor to convert excess ammonium sulphate to calcium sulphate (which precipitated as gypsum and is removed from the liquor) and ammonia. The gypsum is discarded and the ammonia is recycled to the leaching step 1.

The cupriferous raw materials employed in the practice of my invention include all copper-bearing materials that can be leached with ammonium sulphate-containing ammoniacal aqueous leach mediums to obtain complex water soluble compounds of ammonia and copper sulphate. In particular, sulphidic copper ores, ore concentrates and mattes by smelting these ores and ore concentrates are useful starting materials. The most common copper-containing sulphidic ores are mixtures of minerals identified as chalcopyrites ($CuFeS_2$), chalcocites ($Cu_2S$), covellites ($CuS$) and bornites ($FeS \cdot 2Cu_2S \cdot CuS$). The mattess obtained by smelting these minerals comprises essentially complex iron and copper sulphides together with a variety of other metal sulphides. These sulphidic raw materials normally contain between 20 to 50% by weight copper and are readily amenable to leaching with an ammoniacal ammonium sulphate leach medium, in the presence of oxygen, to produce a copper-containing pregnant leach liquor substantially free of dissolved iron. The reactions which take place in the course of the leaching operation are varied and complex. However, the net effect of these reactions may be represented by the following equations:

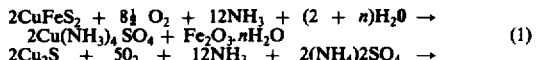
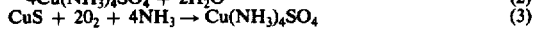

$$2CuFeS_2 + 8\tfrac{1}{2} O_2 + 12NH_3 + (2 + n)H_2O \rightarrow 2Cu(NH_3)_4SO_4 + Fe_2O_3 \cdot nH_2O \quad (1)$$
$$2Cu_2S + 5O_2 + 12NH_3 + 2(NH_4)_2SO_4 \rightarrow 4Cu(NH_3)_4SO_4 + 2H_2O \quad (2)$$
$$CuS + 2O_2 + 4NH_3 \rightarrow Cu(NH_3)_4SO_4 \quad (3)$$

As noted, the aqueous leach medium comprises an ammonia-and-ammonium sulphate-containing aqueus solution. The mole ratio of ammonium sulphate and ammonia present in the leach medium to copper present in the material to be leached is advantageously such that the leach medium contains from about 0.15 to 3.00, and preferably from about 0.25 to 0.75 mole of ammonium sulphate in solution, and from about 4:1 to 10:1 and preferably from about 6 to 8 moles of ammonia per mole of copper present in the material to be leached. The water content of the leach medium is advantageously so that the combined concentration of ammonium sulphate and ammonia therein is within the range of from about 50 to 350 grams per liter (gms/l). Leach mediums containing lower concentrations of ammonia and ammonium sulphate can be employed but the solution is so dilute and such large quantities of the solution are required to be handled that the process becomes economically unattractive. Similarly, leach media containing higher concentrations of ammonia and ammonia sulphate can be employed but solution viscosity and salting out problems due to the high concentration render the use of such concentrated liquors impractical. It has also been found that during the leaching process ammonium sulphate compounds ($NH_4SO_3NH_2$) are formed in concentrations as high as 60 gms/l and that these compounds appear to aid leaching by increasing the reaction rate. In addition, the presence of these compounds which are reducing in nature have been found to have no deleterious effect on the organic liquid ion extractants. In fact, they were found to inhibit the degredation rate of the organic liquid ion extractants used as these compounds tend to lose extraction efficiency in the presence of highly oxidizing media. Moreover, during the leaching step a number of unsaturated sulphur compounds (ammonium thiosulphates having chemical formations of $(NH_4)_2S_2O_3$ and $(NH_4)_2S_3O_6$, etc.) were also formed in the early stages of leaching.

In the embodiment of my invention shown in FIG. 1, the cupriferous raw material is subjected to co-current leaching, with the aforementioned aqueous leach medium. Co-current leaching step 1 of FIG. 1 involves a single step leach whereby the copper bearing sulphidic material is leached to exhaustion with the leach solution and solids flowing in the same direction through a single vessel or a series of vessels. Leaching may be conducted under atmospheric conditions or under superatmospheric pressures. In either case, the leach vessel must be provided with means for agitating the leach slurry and for dispersing free oxygen, as oxygen gas, air or oxygen enriched air, in the leaching medium. With atmospheric leaching, the leaching rate is generally slower than it is with pressure leaching, although in some cases, particularly where the feed material is very finely divided, e.g. 95% or better minus 325 mesh standard Tyler screen and/or where the copper is present as more reactive species, such as chalcocite, covellite or bornite, it may be advantageous to conduct the leaching step 1 under atmospheric conditions.

In the case where pressure leaching is employed, the temperature is advantageously maintained at at least 120° F., and preferably within the range of 150° to 220° F., and the partial pressure of oxygen (either as pure oxygen or as a mixed gas such as air) is maintained at about at least 10, and preferably between about 15 and 150 psig. The pH of the leach solution is at least 7.5 and normally is within the range of between 8 and 10. The leaching operation is continued for a sufficient period of time to dissolve at least about 90% of the copper content of the starting materials, and normally this degree of copper recovery is obtained within a period of 45 to 120 minutes.

Figure 2:
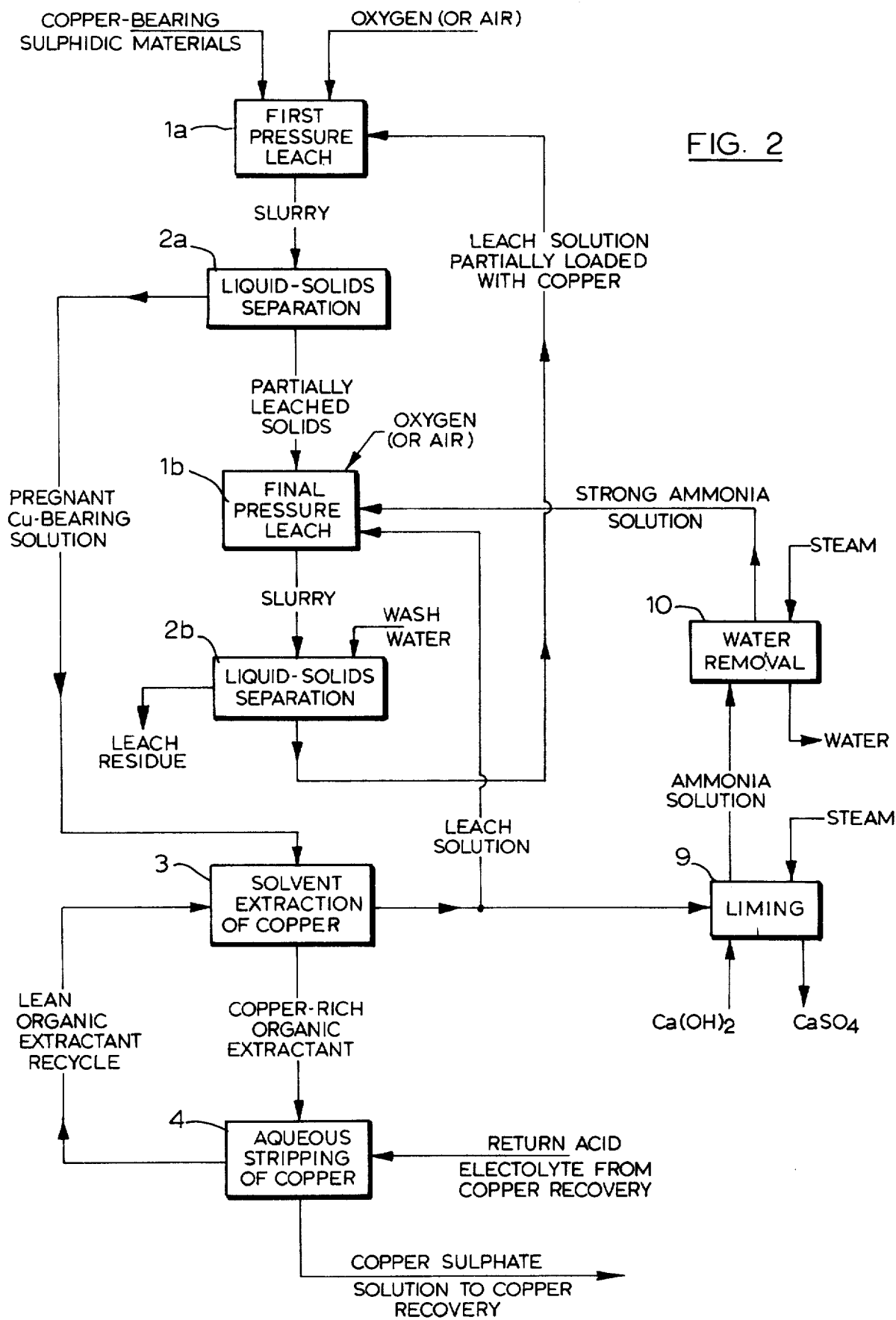
FIG. 2 is a schematic flow sheet of a modification of the process shown in FIG. 1 wherein the cupriferous raw material is subjected to counter-current leaching as hereinafter more fully explained.

In the modification of my process shown in FIG. 2, the cupriferous raw material is subjected to counter-current leaching with the ammoniacal aqueous leach medium. Counter-current leaching involves subjecting the solid material to at least two, and possibly more, leaching steps in which the leach medium is cause to flow in the opposite direction to that of the solids being leached. Thus, referring to FIG. 2, the fresh cupriferous raw material is subjected to a first leaching step 1a where it is leached with leach medium partially loaded with copper from a subsequent leaching step 1b of the process. The pregnant copper-bearing leach medium is separated from the partially leached solid material at liquid-solids separation step 2a, and the pregnant solution is sent to the solvent extraction-of-copper step 3 of the process. The partially leached raw material from the separation step 2a is then subjected to a second (and in this case, final) leaching step 1b where it is leached to substantial exhaustion with fresh or newly regenerated ammoniacal leach medium. After a second liquid-solids separation step 2b the exhausted leach residue is washed and discarded, and the ammoniacal leach medium now partially loaded with copper is sent to the first leaching step 1a of the process. Two stage counter-current leaching of the type just described results in higher copper extraction efficiencies than single stage cocurrent leaching, the copper extraction efficiency ranging from 98.2 to 99% in the usual case with pressure leaching. Moreover, it is obvious that the counter-current leaching procedure need not be limited to two leaching steps or stages, three or more counter-current leaching steps readily being incorporated in the process of my invention should economic or operational considerations so require.

The single step 1 of the co-current leach procedure shown in FIG. 1, and each of the several steps 1a, 1b, etc. of the counter-current leach procedure shown in FIG. 2, can be carried out in a single vessel or, alternatively, in a series of vessels through which the solid materials being leached and the leach medium flow either in the same direction (co-currently) or in opposite direction (counter-currently). The pressure leaching of sulfidic copper minerals in accordance with the practice of my process under representative conditions is illustrated in the following table:

TABLE I

| Leaching of Pure Copper Sulphide Materials | | | | |
|---|---|---|---|---|
| | Percent Extraction | | | |
| Leaching Conditions | Bornite | Chalcocite | Chalcopyrite | Covellite |
| 1. Leaching Pulp Density | | | | |
| a. 5% Solids | | | | |
| Copper extraction % | 99.0% | 99.7% | 95.8% | 99.8% |
| b. 10% Solids | | | | |
| Copper extraction % | 99.0% | 99.4% | 95.6% | 99.8% |
| 2. Leaching Temperature, ° F. | 170 | 170 | 170 | 170 |
| 3. Oxygen partial pressure, psig. | 100 | 100 | 100 | 100 |
| 4. Free Ammonia in leach liquors (Moles per mole of copper) | 6.5 | 6.5 | 6.5 | 6.5 |
| 5. Ammonium Sulphate concentration in leach liquors (Moles per mole of copper) | 0.5 | 0.25 | 0.75 | 0.25 |

TABLE I-continued

| Leaching of Pure Copper Sulphide Materials | | | | |
|---|---|---|---|---|
| | Percent Extraction | | | |
| Leaching Conditions | Bornite | Chalcocite | Chalcopyrite | Covellite |
| 6. Leaching time, minutes | 60 | 60 | 60 | 60 |

The effect of reaction time on the degree of copper recovery from a composite of commercial flotation concentrates containing the four minerals referred to in Table I is illustrated in the following table:

TABLE II

| REACTION TIME, MINUTES | COPPER EXTRACTION, PERCENT |
|---|---|
| 15 | 58.6 |
| 30 | 87.2 |
| 45 | 92.3 |
| 60 | 96.4 |
| 90 | 98.7 |
| Test Conditions: | |
| Leaching temperature | 170° F. |
| Pulp Density | 5% by wt solids |
| Oxygen partial pressure | 100 psig |
| Free ammonia added | 2 lbs. per lb of contained copper |
| Ammonium Sulphate added | 1.5 lbs. per lb of contained copper |

The results obtained when a commercial grade copper sulphide concentrate was leached at relatively low oxygen partial pressure in accordance with my process are reported in Table IIIa and IIIb.

Single stage co-current leaching of the sulphidic ore concentrate was employed in the runs reported in Table III a. The various leach solutions are classified as fresh leach solution, first generation leach solution, second generation leach solution, and third generation leach solution. The fresh leach solution was synthetically prepared from commercial chemicals. First generation leach solution is the same prepared solution which has gone through the cycle of leaching, copper extraction with liquid ion extractants and liming for ammonium sulphate adjustment only one time. Second generation solution has gone through the cyclic circuit twice, and third generation solution has gone through the circuit three times.

Two stage counter-current leaching of the sulphidic ore concentrate was employed in the runs reported in Table IIIb. The first stage is called the adjustment leach in which fresh copper-bearing sulphidic matrial is leached with partially loaded solution from the final leach stage to obtain a pregnant leach liquor of the desired concentration. The second stage is called the final leach in which the partially leached ore is leached to substantial exhaustion with fresh or regenerated leach solution. The partially loaded leach solution from the final leach is used to leach a fresh supply of ore in the next adjustment leach of the continuous cycle.

TABLE IIIa

CO-CURRENT LEACHING OF A COMMERCIAL GRADE COPPER BEARING SULFIDIC CONCENTRATE AT LOW OXYGEN PARTIAL PRESSURES

Concentrate Analysis

| Insol | 24.95% (by wt DRY) | Total Copper | 26.3% (by wt DRY) |
|---|---|---|---|
| Acid Soluble Copper | 0.10 | Total Iron | 20.1 |
| Copper as Chalcocite | 12.3 | Total Sulfur | 23.9 |
| Copper as Chalcopyrite | 14.4 | Sieve Analysis | 90% minus 200 mesh |

| | LEACH FEED SOLUTION CONCENTRATION | | | | LEACHING CONDITIONS | | | PREGNANT LEACH SOLUTION CON. | | | EXTRACTION | |
|---|---|---|---|---|---|---|---|---|---|---|---|---|
| Run No. | Copper gms/l | Free Ammonia gms/l | Ammonium Sulfate gms/l | Ammonium Sulfamates gms/l | Temp °F | Oxygen Partial Pressure PSI | Pulp Density % Solids | Leaching Time Hours | Copper gms/l | Free Ammonia gms/l | Ammonium Sulfamate gms/l | Copper % | Sulfur % |
| 1 | 0 | 54 | 42 | 0 | 200 | 25 | 10 | 3 | 26.9 | 43 | 16.3 | 95.5 | 92.2 |
| 3 | 0 | 81 | 63 | 0 | 200 | 25 | 15 | 3 | 42.8 | 60.6 | 32.4 | 97.3 | 90.5 |
| 6 | 0.1 | 74 | 50 | 2.5 | 200 | 25 | 15 | 3 | 41.2 | 56.5 | 33.8 | 97.2 | — |
| 9 | 0.04 | 72 | 97 | 16.0 | 200 | 20 | 15 | 3 | 39.6 | 53.5 | 40.8 | 95.5 | — |
| 14 | 0.12 | 78 | 132 | 20.6 | 200 | 25 | 15 | 3 | 41.0 | 60.0 | 45.6 | 95.9 | 84.7 |
| 18 | 0.12 | 78 | 132 | 20.6 | 200 | 50 | 15 | 3 | 42.9 | 54.4 | 24.6 | 98.2 | — |
| 21 | 0.07 | 85.5 | 70.6 | 19.7 | 200 | 50 | 15 | 3 | 42.8 | 61.2 | 48.1 | 97.3 | — |

REMARKS:
Runs 1 and 3, Fresh leach solution employed
Runs 6 and 9, First generation leach solution
Runs 14 and 18, Second generation leach solution
Run 21, Third generation leach solution

TABLE IIIb

CO-CURRENT LEACHING OF A COMMERCIAL GRADE COPPER BEARING SULPHIDIC CONCENTRATE AT LOW OXYGEN PARTIAL PRESSURES

Concentrate Analysis

| Insol | 24.95% (by wt DRY) | Total Copper | 26.8% (by wt DRY) |
|---|---|---|---|
| Acid Soluble Copper | 0.10 | Total Iron | 20.1 |
| Copper as Chalcocite | 12.3 | Total Sulphur | 23.9 |
| Copper as Chalcopyrite | 14.4 | Sieve Analysis | 90% minus 200 mesh |

| | LEACH FEED SOLUTION CONCENTRATION | | | | LEACHING CONDITONS | | | PREGNANT LEACH SOLUTION CON. | | | EXTRACTION |
|---|---|---|---|---|---|---|---|---|---|---|---|---|
| Run No. | Copper gms/l | Free Ammonia gms/l | Ammonium Sulphate gms/l | Ammonium Sulphamate gms/l | Temp °F | Oxygen Partial Pressure PSI | Pulp Density % Solids | Leaching Time Hours | Copper gms/l | Free Ammonia gms/l | Ammonium Sulphamate gms/l | Copper % |
| 22A | 0.07 | 85.5 | 70.6 | 19.7 | 200 | 50 | 15 | 1/2 | 33.7 | 87.2 | 50.3 | 98.8 |
| 22B | 0.07 | 85.5 | 70.6 | 19.7 | 200 | 50 | residue | 3 | 9.6 | 53.3 | 16.3 | 98.8 |
| 23A | 9.6 | 83.3 | — | 16.3 | 200 | 50 | 15 | 1/2 | 40.1 | 53.9 | 23.0 | 98.2 |
| 23B | 0.07 | 85.5 | 70.6 | 19.7 | 200 | 50 | residue | 3 | 10.8 | 56.0 | 10.6 | 98.2 |
| 24A | 10.8 | 56.0 | — | 10.6 | 200 | 50 | 15 | 1/2 | 38.9 | 46.6 | 12.0 | 99.0 |
| 24B | 0.05 | 93.5 | 100 | 20.6 | 200 | 50 | residue | 3 | 13.6 | 63.0 | 12.1 | 99.0 |
| 25A | 13.6 | 63.0 | — | 12.1 | 200 | 50 | 15 | 1/2 | 38.6 | 50.6 | 24.2 | 98.9 |
| 25B | 0.05 | 93.5 | 100 | 20.6 | 200 | 50 | residue | 3 | 12.8 | 50.3 | 12.5 | 98.9 |
| 26A | 12.8 | 50.3 | — | 12.5 | 200 | 50 | 15 | 1 | 24.8 | 42.6 | 35.5 | 98.4 |
| 26B | 0.05 | 93.5 | 100 | 20.6 | 200 | 50 | residue | 3 | 26.8 | 57.8 | 20.4 | 98.4 |

REMARKS:
Run 22A, Adjustment leach, Third generation solution
Run 22B, Final leach, Third generation solution
Run 23A, Adjustment leach, Solution from 22B
Run 23B, Final leach
Run 24A, Adjustment leach, Solution from 23B
Run 24B, Final leach
Run 25A, Adjustment leach, Solution from 24B
Run 25B, Final leach
Run 26A, Adjustment leach, Solution from 25B
Run 26B, Final leach On completion of the leaching operation the pregnant copper-containing leach liquor is separated from the insoluble residue of the leach operation by means by conventional procedures such as thickening, filtering, settling, and decanting, or the like. The insoluble leach residue contains substantially all of the iron that may have been present in the cupriferous starting materials, together with such other insolubles as siliceous gangue and the like, which were present in the initial raw material. The concentration of copper in the pregnant leach liquor is in the order of from 5 to 150, and normally is between about 20 and 80, gms/l and in addition the leach liquor contains appreciable amounts of ammonium sulfate, free ammonia, unsaturated sulphur compounds, such as ammonium thiosulphates, and ammonium sulfamate.

In the solvent extraction-of-copper step 3 of the process, the copper- containing aqueous leach liquor is contacted with an organic solution containing an organic metal ion extractant for copper of the liquid ion exchange type. The organic extractant has a substantially greater affinity for copper ions than for the other cations present in the leach liquor, the selectivity of the extractant for copper under the conditions employed in my process being such that on completion of the extraction operation the organic phase contains substantially all of the copper initially present in the leach liquor to the exclusion of any other metallic ion. The liquid organic metal ion extractants useful in the practice of our invention include hydrocarbons with a straight chain of 9 or 10 carbon atoms terminating in an oxime group modified by adajcent hydroxy or other chemical groups. Several companies have compounds of this nature on the market; the most notable are compounds made by General Mills having the trade names LIX-63 and LIX-64. The organic extractant is normally dissolved in an organic diluent that is immiscible in water. Such organic diluents include such alkyl and aryl hydrocarbons as kerosene, benzene, toluene, etc. the chlorinated or fluorinated derivatives of these hydrocarbons, petroleum fractions and derivatives thereof, and the like. However, I presently prefer to use kerosene as the organic diluent for the extractant.

the organic extractant in the organic phase, the quantity of copper that was present in the pregnant leach liquor, the organic to aqueous phase ratio, and the like, the organic phase recovered from the extraction step of the process will contain from about 0.5 to 10 gms/l copper.

The results obtained when a typical copper-containing leach liquor from the leaching step of my process is subjected to solvent extraction in a four stage extracting circuit in accordance with the practice of my invention are illustrated in Table IV.

TABLE IV

CONTINUOUS COPPER EXTRACTION BY METAL ION EXTRACTANTS
(Mixture of LIX 63 and LIX 64)
FROM AMMONIA-AMMONIUM SULFATE LEACHING SOLUTIONS
OF SULFIDIC COPPER CONCENTRATES

| Run No. | FLOW Organic to Aqueous Ratio | AQUEOUS FEED CONCENTRATION | | | | ORGANIC FEED | | FOUR STAGE COPPER EXTRACTION CHARACTERISTICS | | | | | | | |
|---|---|---|---|---|---|---|---|---|---|---|---|---|---|---|---|
| | | Copper gms/l | Free Ammonia gms/l | Ammonium Sulfate gms/l | Ammonium Sulfamate gms/l | Extract Conc. % | Copper Conc. gms/l | ORGANIC PHASE Copper Concentration | | | | AQUEOUS PHASE Copper Concentration | | | |
| | | | | | | | | Stage No. 1 gms/l | Stage No. 2 gms/l | Stage No. 3 gms/l | Stage No. 4 gms/l | Stage No. 1 mgs/l | Stage No. 2 gms/l | Stage No. 3 gms/l | Stage No. 4 gms/l |
| 1 | 2.3:1 | 12.0 | 21.2 | 50 | 1.5 | 10 | 0 | 5.2 | 4.3 | 0.85 | 0.05 | 11.9 | 7.4 | 0.9 | 0 |
| 2 | 3.7:1 | 21.6 | 21.2 | 50 | 15 | 10 | 0 | 6.0 | 5.7 | 3.4 | 0.4 | — | — | — | 0 |
| 3 | 6.3:1 | 36.0 | 45 | 130 | 20 | 10 | 0 | 5.96 | 5.0 | 2.9 | 0.6 | — | — | — | 0.06 |
| 4 | 7.2:1 | 36 | 45 | 130 | 20 | 10 | 0 | 5.67 | 3.51 | 1.68 | 0.4 | — | — | — | 0.05 |
| 5 | 7.9:1 | 39.4 | 55 | 130 | 32 | 10 | 0 | 4.92 | 3.4 | 1.6 | 0.28 | — | — | — | 0 |
| 6 | 10:1 | 39.4 | 55 | 130 | 32 | 10 | 0.54 | 5.12 | 3.60 | 2.00 | 0.56 | 28.3 | 9.7 | 0.2 | 0.03 |
| 7 | 6:1 | 39.4 | 55 | 130 | 32 | 15 | 0.44 | 6.30 | 5.24 | 3.20 | 1.10 | 29.1 | 4.4 | 1.9 | 0.05 |
| 8 | 6.5:1 | 39.7 | 55 | 130 | 32 | 15 | 0.48 | 6.80 | 5.60 | 3.80 | 1.28 | — | — | — | Trace |
| 9 | 7.1:1 | 38.0 | 55 | 200 | 30 | 15 | 0.76 | 5.92 | 4.08 | 1.76 | 0.80 | — | — | — | Trace |
| 10 | 5.8:1 | 38 | 55 | 200 | 30 | 15 | 0.64 | 5.52 | 3.80 | 1.64 | 0.80 | — | — | — | Trace |
| 11 | 5.3:1 | 35.7 | 46 | 250 | 15 | 15 | 0.68 | 8.08 | 7.60 | 5.40 | 2.46 | 0.0 | — | — | 0.10 |
| 12 | 5.7:1 | 35.7 | 46 | 250 | 15 | 15 | 0.56 | 7.80 | 5.14 | 2.36 | 0.68 | 0 | — | — | |

NOTE:
Duration of Runs - 8 hours.

The concentration of the organic extractant in the organic diluent is in the order of from 2 to 40% by volume, and preferably is between 20-30% by volume. The ratio of the organic phase containing the organic extractant to the aqueous phase comprising the copper-containing leach liquor may range from between 1:1 to 10:1. Extraction is carried out by mixing the aqueous phase with the organic phase to affect transfer of the copper ions present in the aqueous leach liquor on to the organic extractant in the organic phase in accordance with the following equation (where R represents the organic extractant):

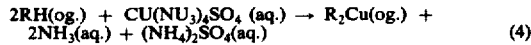

$$2RH(og.) + CU(NU_3)_4SO_4 (aq.) \rightarrow R_2Cu(og.) + 2NH_3(aq.) + (NH_4)_2SO_4(aq.) \quad (4)$$

Extraction is generally carried out in mixer-settler units but other equipment can be used. The copper bearing aqueous is well mixed with the organic extractant in a mixer and then the two phases are permitted to disengage in a settler. Generally three to five stages are needed for complete extraction of copper, one stage being defined as one mixer-settler.

Transfer of the copper to the organic phase is ordinarily completed in less than one minute per stage, although longer mixing times may be employed if desired. On completion of the extraction operation, the mutually immiscible aqueous and organic phases are allowed to separate, and the thus separated phases are separately withdrawn from the mixing vessel for subsequent treatment. The spent aqueous leach liquor reduced in copper content to about 0.01 to 0.10 gm/l is treated as hereinafter described to remove metal cations that tend to build up in the leach liquor and to regenerate the ammonia content of the leach liquor before being recycled for additional leaching. Depending on the concentration of In the copper-stripping step 4 of my process, the copper-containing organic phase is stripped of its copper content by contacting the organic solution with an aqueous solution of sulphuric acid containing at least about 50 gms/l $H_2SO_4$ and preferably from 50 to 350 gms/l $H_2SO_4$ in one or more stages. The copper-containing orgaic phase and the sulphuric acid-containing aqueous phase are thoroughly mixed together in a suitable mixing vessel to effect transfer of the copper from the organic phase to the aqueous phase with the concomitant regeneration of the organic extractant in accordance with the following equation:

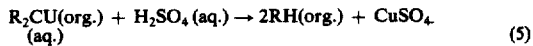

$$R_2CU(org.) + H_2SO_4(aq.) \rightarrow 2RH(org.) + CuSO_4 (aq.) \quad (5)$$

The copper content of the organic phase is reduced to below about 1.0 gms/l copper, and normally below 0.5 gms/l copper, depending on the organic to aqueous phase ratio, the copper content of the organic phase, and the concentration of copper and sulphuric acid in the aqueous phase feed stream. Transfer of the copper from the organic phase to the aqueous phase is substantially completed within about one minute, although longer mixing times can be employed, and copper stripping efficiencies in excess of 90 percent are normally obtained. The ratio of the organic phase to the aqueous phase may range from about 0.5:1 to about 3:1 and preferably is within the range of from about 1:1 to 1.5:1. The results obtained when typical copper-containing organic extractant solutions are stripped in a single stage and in multiple stages in accordance with the practice of my process are shown in the following Tables V and VI, respectively.

TABLE V

SINGLE STAGE STRIPPING OF COPPER FROM PREGNANT ORGANIC EXTRACTANT SOLUTIONS WITH AQUEOUS SOLUTIONS OF SULPHURIC ACID

| | RUN NUMBER | | |
|---|---|---|---|
| | 1 | 2 | 3 |
| Pregnant Organic Solution | | | |
| Copper gms/l | 2.34 | 1.50 | 1.00 |
| Extractant, % vol. | 10 | 6 | 6 |
| Aqueous Strip Solution | | | |
| Sulphuric acid, gms/l | 200. | 230. | 175. |
| Stripping Conditions | | | |
| Organic to Aqueous ratio | 3:1 | 2:1 | 1:1 |
| Mixing time, minutes | 1 | 1 | 1 |
| Stripped Organic Solution | | | |
| Copper gms/l | 0.12 | 0.08 | 0.028 |
| Extractant % vol. | 10 | 6 | 6 |
| Pregnant Aqueous Solution | | | |
| Free Acid gms/l | 60 | 85 | 95 |
| Copper gms/l | 88.5 | 93 | 50 |
| $(CuSO_4)$ gms/l | 222. | 235. | 125. |
| Copper Stripping Efficiency | | | |
| Copper recovery, % | 98.2 | 95 | 97.2 |

TABLE VII

COPPER SULPHATE SOLUTION PREPARED BY ACID STRIPPING OF LOADED ORGANIC

| COMPONENT | CONCENTRATION (gm/l) |
|---|---|
| Copper (as Sulphate) | 80.0 |
| Calcium | 0.14 |
| Silicon | 0.016 |
| Zinc | 0.12 |
| Cadmium | 0.04 |
| Boron | Nil |
| Manganese | 0.002 |
| Iron | 0.05 |
| Antimony | 0.014 |
| Magnesium | 0.08 |
| Lead | 0.017 |
| Nickel | 0.016 |
| Aluminum | 0.003 |
| Chromium | 0.006 |
| Molybdenum | Nil |
| Tin | Nil |
| Sodium | Trace |
| Silver | Nil |
| Cobalt | Nil |
| All others | Nil |
| Free $H_2SO_4$ | 70 |

TABLE VI

CONTINUOUS MULTI-STAGE COPPER STRIPPING FROM METAL ION EXTRACTANTS (ORGANIC PHASE) WITH CONCENTRATED SULPHURIC ACID (AQUEOUS STRIP PHASE)

| | ORGANIC PHASE | | | | | | | | | AQUEOUS STRIP PHASE | | | |
|---|---|---|---|---|---|---|---|---|---|---|---|---|---|
| | Copper Concentration | | | | | Copper Concentration | | | | Sulphuric Acid Concentration | | | |
| Run No. | Feed Organic gms/l | Stage No. 1 gms/l | Stage No. 2 gms/l | Stage No. 3 gms/l | Stage No. 4 gms/l | Stage No. 1 gms/l | Stage No. 2 gms/l | Stage No. 3 gms/l | Stage No. 4 gms/l | Stage No. 1 gms/l | Stage No. 2 gms/l | Stage No. 3 gms/l | Stage No. 4 gms/l |
| 1 | 5.2 | 3.3 | 1.3 | 0.0 | 0.00 | 37.4 | 22.0 | 6.5 | — | 70 | 93.5 | 116.5 | 150 |
| 2 | 6.0 | — | — | trace | 0.00 | 52.4 | 32.9 | 13.9 | — | 43 | 79.5 | 106.5 | 150 |
| 3 | 5.96 | — | — | 0.24 | 0.00 | 58.2 | 46.8 | 14.1 | — | 22.0 | 31.8 | 80.0 | 120 |
| 4 | 5.76 | — | — | 0.54 | 0.00 | 62.1 | 40.8 | 16.1 | — | 23.0 | 65.0 | 103 | 120 |
| 5 | 4.92 | 2.3 | 0.8 | 0.58 | 0.48 | — | — | — | — | — | — | — | — |
| 6 | 5.12 | 2.52 | 0.96 | 0.52 | 0.36 | 37.9 | — | — | 32.8 | 122.5 | — | — | 130 |
| 7 | 6.30 | 2.84 | 1.24 | 0.76 | 0.48 | 39.8 | — | — | 33.5 | 127.0 | — | — | 136.1 |
| 8 | 6.80 | 1.20 | 0.62 | 0.56 | 0.52 | 38.5 | — | — | 31.7 | 121.0 | — | — | 130.8 |
| 9 | 5.92 | 1.36 | 0.80 | 0.62 | 0.62 | 33.9 | — | — | 28.0 | 124 | — | — | 132.3 |
| 10 | 5.52 | 3.52 | 1.12 | 0.96 | 0.72 | 45.1 | — | — | 39.6 | 105.2 | — | — | 112.7 |
| 11 | 0.08 | 3.20 | 1.04 | 0.64 | 0.64 | 39.3 | — | — | 31.2 | 135.5 | — | — | 147 |

Note:
Duration of Runs - 8 hours
Organic to Aqyeous Ratio - 1:1

On completion of the copper stripping step or steps of the process, the aqueous and organic phases are allowed to separate, the regenerated organic extractant-containing solution is recycled to the solvent extraction step 3 of the process, and the acidic copper sulfate-containing solution is recovered. The copper sulfate solution, which is of especially high purity, is then treated in copper recovery step 5 for the production of very high purity metallic copper in cathode form by electrowinning techniques or for the production of very high purity copper powder by chemical reduction techniques. The copper recovery step 5 is conducted in accordance with conventional electrowinning or direct reduction practice. Regardless of which copper recovery procedure is used, it results in the production of elemental copper and a copper depleted, or lean, return electrolyte containing regenerated sulphuric acid. This lean electrolyte is recycled to the stripping step 4 to be used for producing fresh copper sulphate solution for the copper recovery step.

A typical copper sulfate solution obtained by the practice of my invention has the chemical analysis reported in Table VII. Cathode copper made by electrowinning of this copper sulfate solution is very pure, the cathode containing impurities as reported in Table VIII.

TABLE VIII

PURITY OF CATHODE COPPER MADE BY ELECTROWINNING FROM SOLUTIONS FROM TABLE VII

| Component | % by wt. |
|---|---|
| Magnesium | 0.00017% |
| Silicon | Less than 0.005 |
| Calcium | Less than 0.0001 |
| Other Elements | Nil |
| Copper | Remainder |

Part of the spent leach liquor from the solvent extraction-of-copper step 3 of the process is recycled to the copper leaching step 1 or 1a of the process and the remainder is treated to remove sulphur and, preferably, to regenerate its ammonia content.

As previously noted, ammonium sulphamate and unsaturated sulphur compounds are formed during the leaching process. The quantity of such compounds reporting in the spent liquor from the solvent extraction step 3 will depend, primarily, on the conditions employed in the leaching step 1. Higher temperatures, higher oxygen overpressures and longer retention times will result in lesser quantities of such unsaturated compounds in the leach-end liquor. In any case, where the quantity of these compounds is such that they tend to build up in the process circuit and such build-up cannot be controlled by bleeding solution from the circuit, than I prefer to treat that portion of the liquor which is to be treated for removal of sulphate ions in high temperature oxidation step 7.

In carrying out the oxidation step 7, the solution is charged into a pressure vessel, such as an autoclave, and is heated to a temperature within the range of 150° to 500° F., preferably from about 350° to 450° F. The solution is actively agitated and oxygen gas or a free oxygen bearing gas, such as air or oxygen enriched air, is dispersed in the solution. Preferably, oxygen is supplied at a rate sufficient to maintain the oxygen partial pressure in the vessel above about 5 psi, preferably between about 10 and about 25 psi. These operating conditions are maintained until substantially all sulphur values in the form of unsaturated compounds are oxidized to sulphates. Generally this requires about 2 to about 60 minutes. If the temperature in the oxidation step 7 is sufficiently high, e.g. above about 400° F., then ammonium sulphamate in the liquor will be hydrolyzed to ammonium sulphate. When temperatures in this range are used, it is preferred to treat the feed solution to the oxidation step 7 in ammonia distillation step 6 to distil off free ammonia from the liquor. If this is not done, then much higher pressures will be required in the oxidation-hydrolysis step 7 because of the high vapour pressure of the free ammonia at the high temperatures required for hydrolysis of the ammonium sulphamate.

Ammonium sulphate tends to build up in the leach liquor thereby tying up progressively greater quantities of the free ammonia required in the leaching step of the process. In order to remove the excess sulphate sulphur from the process circuit, part of the solution from the solvent extraction step 3 is treated to recover ammonia and to remove sulphate ions in ammonium sulphate crystallization step 8 and/or liming step 9. Whether one or both of these ammonia recovery - sulphate ion removal methods is employed in any given installation will depend primarily on economic factors pertaining to the particular installation. For example, if there is a satisfactory market for the $(NH_4)_2SO_4$ output of the installation and low cost ammonia is available, then removal of sulphate ions as $(NH_4)_2SO_4$ may be preferred. On the other hand, where ammonia is expensive, lime is inexpensive and there is no economic market for $(NH_4)_2SO_4$, then recovery of ammonia and removal of sulphate ions as $CaSO_4$ may be preferred.

In lining step 9, the excess ammonium sulphate is converted to free ammonia and calcium sulphate in accordance with the following equation:

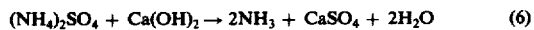

$$(NH_4)_2SO_4 + Ca(OH)_2 \rightarrow 2NH_3 + CaSO_4 + 2H_2O \qquad (6)$$

Calcium sulphate which precipitates from the leach liquor in the form of gypsum is separately recovered or it can be added to the leach residue at liquids-solids separation step 2. In the scheme shown in FIGS. 2, 3 and 4, solution containing regenerated ammonia and residual ammonium sulphate is subjected to an evaporation step 10 to remove excess water thereby obtaining a substantially reconstituted aqueous leach medium suitable for use in the leaching step 1 of the process. Additional ammonia can be added to the regenerated leach medium to make up for any losses experienced in the several steps of the process. The ammonium sulphate content of the leach medium can also be adjusted as required prior to or during the reintroduction of the leach medium into the leaching vessel.

Alternatively, excessive ammonium sulphate that builds up in the spent leach liquor in the course of the leaching and solvent extraction steps of the process can be crystallized out of the solution in $(NH_4)_2SO_4$ crystallization step 8. In this case, the concentrated leach liquor from the evaporator is diluted with water or with untreated spent leach liquor to obtain a leach medium of the required ammonium sulphate concentration and ammonia is introduced into the leach medium to replenish that which was consumed in the leaching and crystallization steps.

The cupriferous starting materials frequency contain a variety of other metal sulphides, such as various iron, zinc nickel, cobalt sulfides, in addition to copper sulfides. The ammoniacal leach liquor does not dissolve any of the iron present in the sulfidic starting materials, the iron remaining in the insoluble leach residue in the form of ferric oxide. However, the ammonical leach liquor does not dissolve such metals as zinc, nickel, cobalt, and the like, that may be present in the cupriferous starting materials. The highly selective solvent extraction step 3 of the process results in the extraction of copper from the leach liquor to the exclusion of other metal ions present in the liquor. The concentration of these non-extracted metal cations will build up in the leach liquor and eventually cause operating difficulties unless they are removed from the leach liquor prior to returning the liquor to the leaching step.

Figure 3:
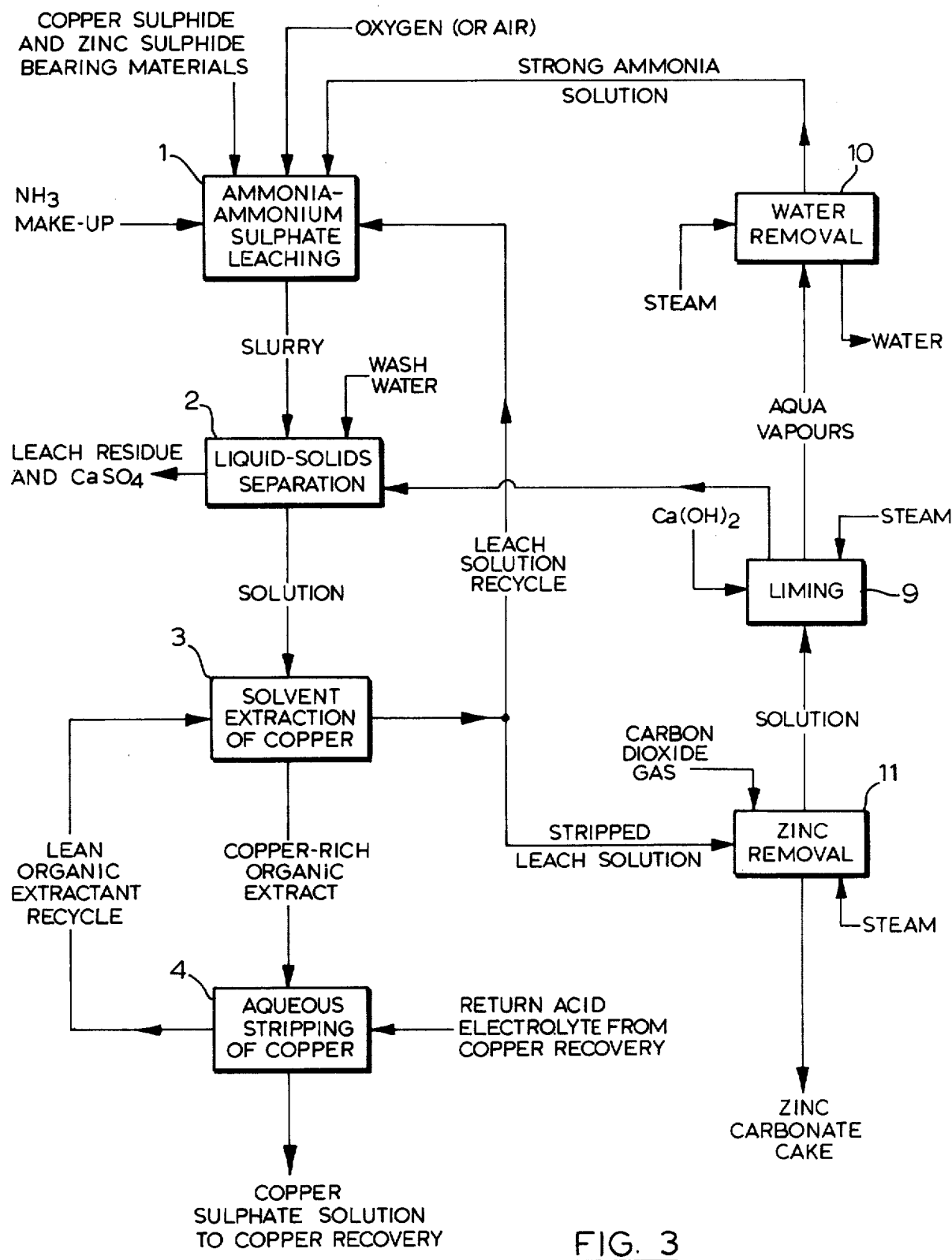
FIG. 3 is a schematic flow sheet of a modification of the process shown in FIG. 1 wherein the spent leach liquor is treated with carbon dioxide gas to precipitate the zinc content of the liquor in the form of basic zinc carbonate.

For example, when the cupriferous starting materials contain zinc as shown in FIG. 3, this metal accumulates in the leach liquor as zinc sulfate. The zinc is readily removed from the spent leach liquor by treating the leach liquor with carbon dioxide under pressure in a carbonation step 11 to precipitate the zinc as a pure basic zinc carbonate cake as shown in FIG. 3. By way of example, it has been found that when a pregnant leach liquor containing approximately 21 gms/l of copper, 10 gms/l of zinc, 40 gms/l of free ammonia, and 360 gms/l of ammonium sulfate was contacted with a kerosene solution containing 5 percent by volume LIX-63 at an organic to aqueous phase ratio from 1:1, the extraction of substantially all of the copper content, to the exclusion of the zinc content, of the liquor was effected. After separation of the zinc-containing aqueous phase from the copper-containing organic phase, the aqueous phase (containing 10 gms/l zinc and less than 0.2 gms/l copper) was treated with carbon dioxide at a pressure of 100 psig and a temperature of 150° F. for a period of 2 hours. A substantially pure basic zinc carbonate cake precipitated from the solution and was separated and recovered by filtration. The purified aqueous phase contained less than 1.0 gms/l zinc.

Metals such as nickel and cobalt, which may be present in the spent leach liquor, may be precipitated and separated therefrom by treating the leach liquor with hydrogen sulfide gas in a manner known in the art.

Figure 4:
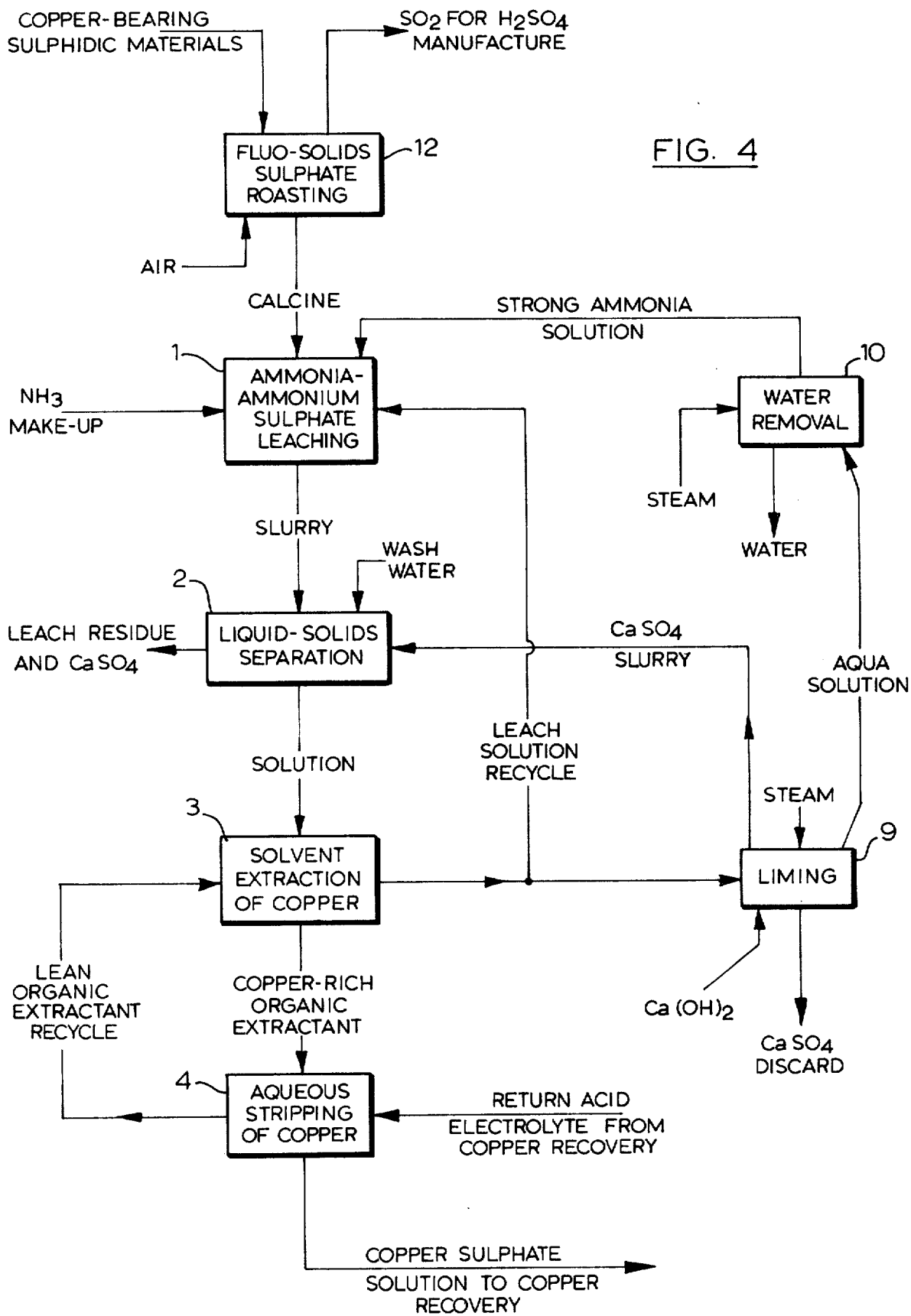
FIG. 4 is a schematic flow sheet of a modification of the process shown in FIG. 1 wherein the cupriferous raw material is given a preliminary roast to reduce the sulphur content thereof.

It is apparent from equations (1), (2), (3), and (4) that ammonia is consumed and ammonium sulfate is produced in proportion to the amount of sulfidic sulfur present in the cuperferous starting materials. Accordingly, in the case of high-grade starting materials (that is, ore concentrates and mattes containing more than about 50 percent by weight sulfidic copper), the starting materials are advantageously subjected to a preliminary sulfating roast as shown in FIG. 4 to drive off in excess of 50 percent of the combined sulfur in the form of sulfur dioxide. The preliminary sulfating roast is advantageously carried out in fluo-solids roasting apparatus, and the sulfur dioxide is recovered and used for the manufacture of sulfuric acid. The roasted cuperiferous starting material is then leached with the ammonia and ammonium sulfate-containing leach medium as previously described.

The data reported in the preceding tables, together with the following specific example, are illustrative but not limitative of the practice of my invention.

EXAMPLE

A sulfidic copper ore concentrate containing about 20 percent by weight copper and about 20 percent by weight iron was leached with an ammoniacal leach medium containing about 73 gms/l free ammonia and about 44 gms/l ammonium sulfate. The leaching temperature was about 170° F., the partial pressure of oxygen maintained in the leaching vessel was about 100 psig, the mol ratio of ammonium sulfate to copper was about 0.5, and the mol ratio of free ammonia to copper was about 6.5. After leaching for a period of one hour, the pregnant leach liquor was separated from the insoluble leach residue. The leach liquor contained about 42 gms/l of copper, 28 gms/l free ammonia, and less than 0.05 gms/l iron. The copper-containing leach liquor was contacted with a solution of an organic extractant comprising 10 percent by volume of LIX-63 in kerosene. The ratio of the volume of the organic phase to the aqueous phase was 4:1 in each of two extraction stages, and two phases were mixed together for a period of 30 seconds. On completion of the extraction operation, the two phases were allowed to separate, and they were then separately recovered. The organic phase contained about 5 gms/l copper and the spent leach liquor of reduced content contained about 2 gms/l copper. The copper-containing organic phase was then contacted with an aqueous solution containing 200 gms/l sulfuric acid to strip the copper from the organic phase. The ratio of the volume of the organic extract phase to the aqueous strip solution was 3:1, and the mixing time was about one minute. The stripped organic phase contained less than 0.3 gms/l copper, and the aqueous phase contained about 14 gms/l copper. The two phases were separated, the organic phase was recycled to the solvent extraction step of the process, and the aqeuous phase containing about 14 gms/l copper and less than 0.05 gms/l of other metal ions was recovered.

The spent leach liquor containing about 2 gms/l copper was treated with sufficient lime to precipitate about one half of the sulfate content of the liquor in the form of calcium sulfate. The precipitated gypsum was removed from the leach liquor and, after evaporation of excess water, the purified and regenerated leach medium was recycled to the leaching step of the process.

From the foregoing description of my new process for making pure copper sulfate solutions, it will be seen that I have made an important contribution to the art to which my invention relates.

What I claim as new and desire to protect by Letters Patent of the United States is:

1. A process for recovering copper from cupriferous sulphidic material comprising the following steps:
   a. leaching the cupriferous sulphidic material under oxidizing conditions with an ammonium sulphate-containing ammoniacal aqueous leach medium to obtain a substantially iron-free copper-containing aqueous liquor and an insoluble residue;
   b. separating the copper-containing aqueous leach liquor from the insoluble residue;
   c. contacting the separated copper-containing aqueous leach liquor with an organic extractant for copper of the ionic exchange type having substantially greater affinity for copper ions than other cations present in the aqueous leach liquor to extract copper from the aqueous leach liquor, said organic extractant being dissolved in a substantially water-immiscible organic diluent;
   d. separating the ammonical ammonium sulphate-containing aqueous leach liquor of reduced copper content from the organic diluent and dissolved copper-carrying organic extractant;
   e. recycling a portion of the separated ammoniacal aqueous leach liquor containing ammonium sulphate directly to the leaching step;
   f. recycling another portion of the separated aqueous leach liquor to the leaching step via a sulphate ion removal step and a subsequent water removal step, said sulphate ion removal step removing an amount of sulphate ions from said other portion of the aqueous leach liquor about equivalent to the sulphur extracted from the cupriferous sulphidic material in the leaching step, and said water removal step adjusting the ammonia concentration of said other portion of the aqueous leach liquor;
   g. contacting the organic diluent and dissolved copper-carrying organic extractant with an aqueous solution of sulphuric acid to strip copper from the copper-carrying organic extractant, thereby reconstituting the organic extractant and forming an acidic copper sulphate solution;
   h. separating the organic diluent and reconstituted dissovled organic extractant from the acidic copper sulphate solution;
   i. recycling the separated organic solvent diluent and reconstituted dissolved organic extractant to copper extraction step (c);
   j. recovering copper in elemental form from the acidic copper sulphate solution in a copper winning operation to produe elemental copper and sulphuric acid solution; and
   k. recycling the sulphuric acid solution to copper stripping step (g).

2. A process for recovering copper from cupriferous sulphidic material comprising the following steps:
   a. leaching the cupriferous sulphidic material under oxidizing conditions with an ammonium sulphate-containing ammoniacal aqueous leach medium to obtain a substantially iron-free copper-containing aqueous leach liquor and an insoluble residue;
   b. separating the copper-containing aqueous leach liquor from the insoluble residue;
   c. contacting the separated copper-containing aqueous leach liquor with an organic extractant for copper of the ionic exchange type having substantially greater affinity for copper ions than for other cations present in the aqeuous leach liquor to extract copper from the aqueous leach liquor, said organic extractant being dissolved in a substantially water-immiscible organic diluent;
   d. separating the ammoniacal ammonium sulphate-containing aqueous leach liquor of reduced copper content from the organic diluent and dissolved copper-carrying organic extractant;
   e. recycling a portion of the separated ammoniacal aqueous liquor containing ammonium sulphate directly to the leaching step;
   f. recycling another portion of the separated aqueous leach liquor to the leaching step via an ammonium distillation step and a subsequent sulphate ion removal step, ammonia being distilled off from said other portion of the aqueous leach liquor during said ammonium distillation step and recycled to the leaching step, and said sulphate ion removal step removing an amount of sulphate ions from said other portion of the aqueous leach liquor about equivalent to the sulphur extracted from the cupriferous sulphate material during the leaching step;

g. contacting the organic diluent and dissolved copper-carrying organic extractant, thereby reconstituting the organic extractant and forming an acidic copper sulphate solution;

h. separating the organic diluent and reconstituted dissolved organic extractant from the acidic copper sulphate solution;

i. recycling the separated organic diluent and reconstituted dissolved organic extractant to copper extraction step (c);

j. recovering copper in elemental form from the acidic copper sulphate solution in a copper winning operation to produce elemental copper and sulphuric acid solution; and k. recycling the sulphuric acid solution to copper stripping step (g).

3. A process according to claim 2 wherein, after said ammonia distillation step and before the sulphate ion removal step, said other portion of the aqueous leach liquor is subjected to an oxidation step at elevated temperature and pressure to convert substantially all sulphur values contained therein to sulphate form and to hydrolyze any ammonium sulphamate therein to ammonium sulphate.

4. A process for recovering copper from the cupriferous sulphidic material comprising the following steps:

a. leaching the cupriferous sulphidic material under oxidizing conditions with an ammonium sulphate-containing ammoniacal aqueous leach medium in an initial leaching step to obtain a substantially iron free copper-containing aqueous leach liquor and a partially leached residue;

b. separating the copper-containing aqueous leach liquor from the partially leached residue;

c. leaching the partially leached residue under oxidizing conditions with an ammonium sulphate-containing ammoniacal aqueous leach medium in a further leaching step to obtain a leach solution partially loaded with copper and an insoluble residue;

d. separating the partially loaded leach solution from the insoluble residue;

e. recyling the partially loaded leach solution to the initial leaching step (a);

f. contacting the separated copper-containing aqueous leach liquor from step (b) with an organic extractant for copper of the ion exchange type having substantially greater affinity for copper ions than other cations present in the aqueous leach liquor to extract copper from the aqueous leach liquor, said organic extractant being dissolved in a substantially water-immiscible organic diluent;

g. separating the ammoniacal copper sulphate-containing leach liquor of reduced copper content from the organic diluent and dissolved copper-carrying extractant;

h. recycling separated ammoniacal aqueous leach liquor containing ammonium sulphate to the further leaching step (c);

i. removing from the ammoniacal aqueous leach liquor, during said recycling, an amount of sulphate ions about equivalent to the sulphur extracted from the cupriferous sulphidic material in the leaching steps;

j. contacting the organic diluent and dissolved copper-carrying organic extractant with an aqueous solution of sulphuric acid to strip copper from the copper-carrying organic extractant, thereby reconstituting the extractant and forming an acidic copper sulphate solution;

k. separating the organic diluent and reconstituted dissolved organic extractant from said acid copper sulphate solution, l. recycling the separated organic diluent and reconstituted dissolved organic extractant to the copper extracting step (f);

m. recovering copper in elemental form from the acidic copper sulphate solution in a copper winning operation to produce elemental copper and sulphuric acid solution; and n. recycling sulphuric acid solution to copper stripping step (j).

5. A process according to claim 4 wherein, in steps (h) and (i), a portion of ammoniacal aqueous leach liquor containing ammonium sulphate is recycled directly to further leach step (c), and another portion is recycled to the further leaching step (c) via a sulphate ion removal step to effect said removal of sulphate ions in the recycled leach liquor.

6. A process according to claim 5 wherein, after said sulphate ion removal step, said other portion of the recycled leach liquor is subjected to a water removal step to adjust the ammonia concentration of said other portion of the leach liquor.

7. A process according to claim 5 wherein the removal of sulphate ions in said other portion of the recycled leach liquor is effected by lime addition to precipitate calcium sulphate which is removed from said other liquor portion.

* * * * *